US011922506B2

(12) United States Patent
Jha et al.

(10) Patent No.: US 11,922,506 B2
(45) Date of Patent: Mar. 5, 2024

(54) PCA-BASED PORTFOLIO MARGINING

(71) Applicant: Chicago Mercantile Exchange Inc., Chicago, IL (US)

(72) Inventors: Udesh Jha, Chicago, IL (US); Jalpan Shah, Chicago, IL (US); Dmitriy Glinberg, Northbrook, IL (US); Edmund Li, Chicago, IL (US); Feliks Landa, Glenview, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

(21) Appl. No.: 18/111,693

(22) Filed: Feb. 20, 2023

(65) Prior Publication Data

US 2023/0196467 A1 Jun. 22, 2023

Related U.S. Application Data

(63) Continuation of application No. 17/181,282, filed on Feb. 22, 2021, now Pat. No. 11,605,133, which is a
(Continued)

(51) Int. Cl.
*G06Q 40/00* (2023.01)
*G06Q 40/06* (2012.01)

(52) U.S. Cl.
CPC .................... *G06Q 40/06* (2013.01)

(58) Field of Classification Search
CPC ...................................................... G06Q 40/06
(Continued)

(56) References Cited

U.S. PATENT DOCUMENTS 7,577,601 B1 * 8/2009 Rademacher .......... G06Q 40/00
705/36 R
7,590,581 B1 * 9/2009 Payne .................... G06Q 40/00
705/36 R
(Continued)

OTHER PUBLICATIONS

The research of margin setting model based on improved BP neural network technology; 2010 Sixth International Conference on Natural Computation (vol. 3, pp. 1167-1171); Jia Liu, Dong-hua Zhu; Aug. 10, 2010. (Year: 2010).*
(Continued)

*Primary Examiner* — Tien C Nguyen
(74) *Attorney, Agent, or Firm* — Lempia Summerfield Katz LLC

(57) ABSTRACT

A computer implemented method determines a margin requirement for a financial product portfolio. Market conditions for the financial product portfolio are characterized by a zero curve. The method includes producing a plurality of scenario curves, each scenario curve reflecting a principal component analysis (PCA) model of the zero curve with a respective PCA factor of a plurality of PCA factors of the PCA model offset from a corresponding base value for the zero curve, calculating a respective projected value of the financial product portfolio for each scenario curve of the plurality of scenario curves, calculating a loss risk amount for each PCA factor based on the respective projected value and a current value of the financial product portfolio, and determining the margin requirement based on a sum of the loss risk amounts for the plurality of PCA factors.

20 Claims, 8 Drawing Sheets

Related U.S. Application Data continuation of application No. 16/783,061, filed on Feb. 5, 2020, now Pat. No. 10,956,979, which is a continuation of application No. 16/279,602, filed on Feb. 19, 2019, now Pat. No. 10,586,287, which is a continuation of application No. 13/956,707, filed on Aug. 1, 2013, now Pat. No. 10,255,636.

(58) Field of Classification Search
USPC .......... 705/35, 39, 40, 37, 38; 700/236; 706/25, 45; 719/315; 715/753; 726/25; 235/375, 380
See application file for complete search history.

(56) References Cited

U.S. PATENT DOCUMENTS

| | | | | |
|---|---|---|---|---|
| 8,200,571 B2* | 6/2012 | Urashima | ............... | G06Q 40/04 705/37 |
| 8,326,722 B2* | 12/2012 | Navin | ............... | G06Q 40/00 705/36 R |
| 8,417,618 B2* | 4/2013 | Milne | ............... | G06Q 40/04 705/37 |
| 2002/0161693 A1* | 10/2002 | Greenwald | ........ | G06Q 30/0601 705/26.1 |
| 2002/0178102 A1* | 11/2002 | Scheinberg | ............ | G06Q 40/04 705/37 |
| 2006/0265296 A1* | 11/2006 | Glinberg | ............... | G06Q 40/03 705/35 |
| 2009/0248588 A1* | 10/2009 | Hadi | ............... | G06Q 40/00 705/36 R |
| 2009/0299916 A1* | 12/2009 | Glinberg | ............... | G06Q 40/06 705/36 R |
| 2010/0017345 A1* | 1/2010 | Hadi | ............... | G06Q 40/03 705/36 R |
| 2017/0206601 A1* | 7/2017 | Weng | ............... | G06Q 40/04 |

OTHER PUBLICATIONS

Optimization of Electricity Retailer's Contract Portfolio Subject to Risk Preferences; IEEE Transactions on Power Systems (vol. 25, Issue: 1, pp. 117-128); J. Kettunen, A. Salo, D.W. Bunn; Feb. 1, 2010. (Year: 2010).*

A. Kreinin et al., "Principal Component Analysis in Quasi Monte Carlo Simulation", 1998, pp. 21-29, 1(2), Algo Research Quarterly.

Bautista Alderete, G. Shucheng Liu, Financial risk management in electricity markets—an ISO perspective, Jul. 1, 2010, IEEE PESGeneral Meeting (pp. 1-6). (Year: 2010).

Carol Alexander, "A Guide to Financial Data Analysis", 2001, Market Models.

Evaluation of margining solutions for the power market spot products; 11th International Conference on the European Energy Market (EEM14) (pp. 1-5); Matin Bagherpour, May 28, 2014. (Year: 2014).

J. Hall, Options, Futures and Other Derivatives, 6th edition, available as early as Aug. 1, 2013.

The research of margin setting model based on improved BP neural network technology; 2010 Sixth International Conference onbrNatural Computation (vol. 3, pp. 1167-1171); Jia Liu; Dong-hua Zhu; Aug. 10, 2010. (Year: 2010).

\* cited by examiner

PCA-BASED PORTFOLIO MARGINING

REFERENCES TO RELATED APPLICATIONS

This application is a continuation under 37 C.F.R. § 1.53(b) of U.S. patent application Ser. No. 17/181,282, filed Feb. 22, 2021, now U.S. Pat. No. 11,605,133, which, in turn, is a continuation of U.S. patent application Ser. No. 16/783, 061, filed Feb. 5, 2020, now U.S. Pat. No. 10,956,979, which, in turn, was a continuation of U.S. patent application Ser. No. 16/279,602, filed Feb. 19, 2019, now U.S. Pat. No. 10,586,287, which, in turn, was a continuation of U.S. patent application Ser. No. 13/956,707, filed Aug. 1, 2013, now U.S. Pat. No. 10,255,636, the entire disclosures of which are hereby incorporated by reference and relied upon.

TECHNICAL FIELD

The following disclosure relates to software, systems and methods for determining margin requirements in a commodities exchange, derivatives exchange or similar business.

BACKGROUND

A financial instrument trading system, such as a futures exchange, referred to herein also as an "Exchange", such as the Chicago Mercantile Exchange Inc. (CME), provides a contract market where financial instruments, for example futures and options on futures, are traded. Futures is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option is the right, but not the obligation, to sell or buy the underlying instrument (in this case, a futures contract) at a specified price within a specified time. The commodity to be delivered in fulfillment of the contract, or alternatively the commodity for which the cash market price shall determine the final settlement price of the futures contract, is known as the contract's underlying reference or "underlier." The terms and conditions of each futures contract are standardized as to the specification of the contract's underlying reference commodity, the quality of such commodity, quantity, delivery date, and means of contract settlement. Cash Settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price.

Options and futures may be based on more abstract market indicators, such as stock indices, interest rates, futures contracts and other derivatives. An interest rate futures contract, also referred to as an interest rate future, is a futures contract having an underlying instrument/asset that pays interest, for which the parties to the contract are a buyer and a seller agreeing to the future delivery of the interest bearing asset, or a contractually specified substitute. Such a futures contract permits a buyer and seller to lock in the price, or in more general terms the interest rate exposure, of the interest-bearing asset for a future date.

An interest rate swap ("IRS") is a contractual agreement between two parties, i.e., the counterparties, where one stream of future interest payments is exchanged for another, e.g., a stream of fixed interest rate payments in exchange for a stream of floating interest rate payments, based on a specified principal amount. An IRS contract may be used to limit or manage exposure to fluctuations in interest rates. One common form of IRS contract exchanges a stream of floating interest rate payments on the basis of the 3-month London interbank offered rate for a stream of fixed-rate payments on the basis of the swap's fixed interest rate. Another common form of IRS contract, knows as an overnight index swap, exchanges at its termination a floating rate payment determined by daily compounding of a sequence of floating interest rates on the basis of an overnight interest rate reference (e.g., the US daily effective federal funds rate, or the European Overnight Index Average (EONIA)) over the life of the swap, for a fixed rate payment on the basis of daily compounding of the overnight index swap's fixed interest rate over the life of the swap.

An IRS futures contract is one in which the underlying instrument is an interest rate swap. As such, an IRS futures contract permits "synthetic" exposure to the underlying interest rate swap, i.e., without entailing actual ownership of the underlying IRS contract.

Typically, the Exchange provides for a centralized "clearing house" through which all trades made must be confirmed, matched, and settled each day until offset or delivered. The clearing house is an adjunct to the Exchange, and may be an operating division of the Exchange, which is responsible for settling trading accounts, clearing trades, collecting and maintaining performance bond funds, regulating delivery, and reporting trading data. The essential role of the clearing house is to mitigate credit risk. Clearing is the procedure through which the Clearing House becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the Clearing House.

The Clearing House of an Exchange clears, settles and guarantees all matched transactions in contracts occurring through the facilities of the Exchange. In addition, the Clearing House establishes and monitors financial requirements for clearing members and conveys certain clearing privileges in conjunction with the relevant exchange markets.

The Clearing House establishes clearing level performance bonds (margins) for all products of the Exchange and establishes minimum performance bond requirements for customers of such products. A performance bond, also referred to as a margin requirement, corresponds with the funds that must be deposited by a customer with his or her broker, by a broker with a clearing member or by a clearing member with the Clearing House, for the purpose of insuring the broker or Clearing House against loss on open futures or options contracts. This is not a part payment on a purchase. The performance bond helps to ensure the financial integrity of brokers, clearing members and the Exchange as a whole. The Performance Bond to Clearing House refers to the minimum dollar deposit, which is required by the Clearing House from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e. a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

The margin requirements for IRS contracts are typically set at a percentage of the notional amount of the contract. As a result, margins for IRS contracts may be unrealistically high and appear to traders as having little to no bearing on the market risk incurred by the exchange in connection with the derivatives.

DETAILED DESCRIPTION

Figure 1:
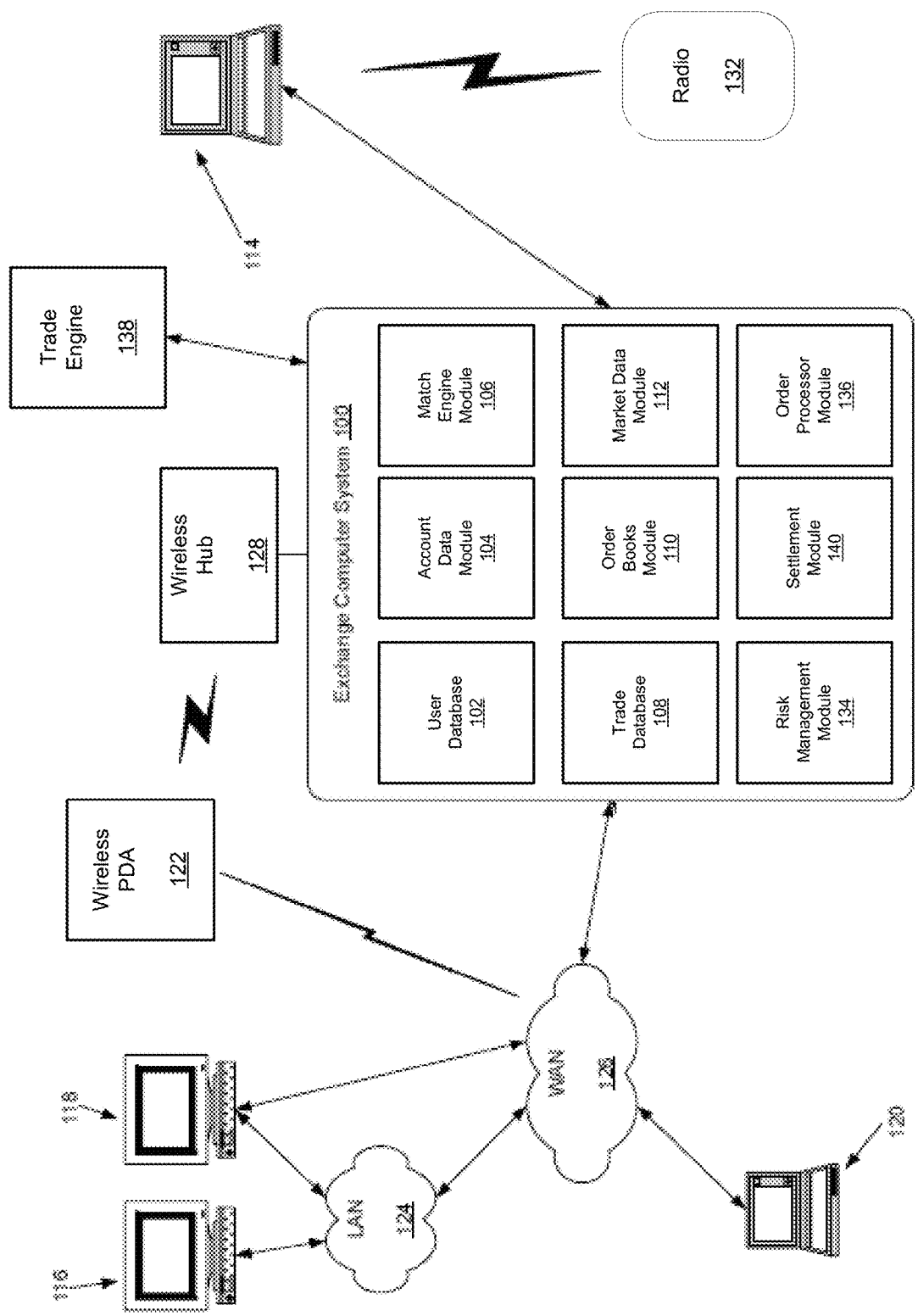
FIG. 1 depicts a block diagram of an exemplary system for trading IRS contracts or other financial products according to the disclosed embodiments.

The disclosed embodiments relate to determining margin requirements for portfolios having interest rate swap (IRS) contracts and other financial products whose market price or conditions are characterized by a zero curve. The margining is based on a principal component analysis (PCA) model of the zero curve. The PCA models of the disclosed embodiments support margining at an adequate coverage level (e.g., 99%) without having to generate a large set of hypothetical scenarios and to implement the corresponding portfolio evaluations. The large set of possible hypothetical scenarios arises in part from the horizon of the zero curves (e.g., quarterly over 30, 40, or 50 years), which are often constructed on a daily basis based on the prices of a collection of instruments to depict where investments would be arbitrage-free. The disclosed embodiments use the PCA model to determine a more computationally manageable set of hypothetical scenario curves that are nonetheless capable of addressing correlation and volatility risks presented by the portfolios.

The use of a PCA model of a zero curve supports the generation of hypothetical scenario zero curves not limited to historical observations. The PCA factors are varied, or shocked, to generate hypothetical zero curve scenarios. Applying shocks to the PCA model of a desired magnitude allows the margin determination to be more forward looking than other techniques based on historical return data. The shocks are not limited to historical observations.

A computationally manageable number of scenario curves are produced by independently shocking or varying a respective one of the PCA factors. For example, the margin requirement determination may use only a pair of scenario curves for each PCA factor. Scenario curves may be produced only for variances along the coordinate axes defined by the PCA factors. In a three-factor embodiment, only six scenario curves are generated. Two scenario curves are generated for each factor, one for a positive variance from a base value, and the other for an equal and opposite variance.

The limited number of scenario curves is nonetheless sufficient for margining purposes. The limited number stands in contrast to full PCA-based simulations (e.g., Monte Carlo simulations) in which billions or trillions (e.g., $2^{16}$) of scenarios are produced, evaluated and processed. While such simulations may be feasible on a one-time basis for a market participant in the midst of an investment decision, the calculations and other processing tasks involved in margin determinations may be implemented repeatedly (e.g., on a daily basis for each trader). The disclosed embodiments provide a mechanism for using a PCA model without testing all of the possible scenarios. The disclosed embodiments may thus decrease the processing load presented by the margin requirement determination. Despite the decreased processing, the disclosed embodiments are nonetheless able to manage risk for over 99% of the scenarios.

The disclosed embodiments may further improve the processing time by optimizing the number of PCA factors to be processed. Risk management systems may have insufficient processing resources to process all of the factors (and resulting scenario curves) for a PCA model that achieves 99% coverage. As described below, in some embodiments, the PCA model is instead factor-deficient. The deficiency may be addressed through a reserve or add-on charge function configured to address how the PCA model is not portfolio-specific. The charge function is used to add a reserve charge to the margin requirement. With the reserve charge, a target coverage of 99% may be achieved with only the top three PCA factors used to model the zero curve. The PCA model may thus include an optimized number of factors to achieve or meet a performance bond coverage target. The optimized number of factors may also lead to improved computational performance through a reduced number of scenarios to be generated, processed, and evaluated.

As discussed above, an IRS contract is a contractual agreement between two parties, i.e., the counterparties, where one stream of future interest payments is exchanged for another, e.g., a stream of fixed interest rate payments in exchange for a stream of floating interest rate payments, based on a specified principal amount. An IRS contract may be used to limit or manage exposure to fluctuations in interest rates.

Although described below in connection with examples involving interest rate swap (IRS) contracts based on LIBOR rates, the methods described herein are well suited for determining margin requirements for a variety of interest rate swaps, interest rate-based products, or other derivative financial products, now available or hereafter developed. For example, the disclosed embodiments may be useful in connection with any product with an uncertain yield curve, such as EuroDollar futures contracts, as well as any forward contract using the yield curve for discounting, or otherwise characterized by a yield curve. The parameters of the IRS or other interest rate-based contract may vary from the examples shown. For example, the disclosed methods and systems are not limited to any particular currency, type (e.g., fixed-for-floating, floating-for-floating, fixed-for-fixed, same or different currencies), duration, rate reset arrangement, payment frequency, or other contract parameter. While the disclosed embodiments are discussed in relation to IRS contracts, the disclosed embodiments may be applicable to other bilateral contracts, equity, options or futures trading system or market now available or later developed.

While the disclosed embodiments may be described in reference to the CME, it will be appreciated that these embodiments are applicable to any Exchange. Such other Exchanges may include a clearing house that, like the CME Clearing House, clears, settles and guarantees all matched transactions in contracts of the Exchange occurring through its facilities. In addition, such clearing houses establish and monitor financial requirements for clearing members and conveys certain clearing privileges in conjunction with the relevant exchange markets.

The disclosed embodiments are also not limited to uses by a clearing house or Exchange for purposes of enforcing a performance bond or margin requirement. For example, a market participant may use the disclosed embodiments in a stress test or other simulation of the performance of a portfolio. In such cases, the margin requirement determination may be useful as an indication of a value at risk rather than a performance bond. The disclosed embodiments may also be used by market participants or other entities to forecast or predict the effects of a prospective position on the margin requirement of the market participant.

The methods and systems described herein may be integrated or otherwise combined with other risk management methods and systems, such as the risk management methods and systems described in U.S. Patent Publication No. 2006/0265296 ("System and Method for Activity Based Margining"), the entire disclosure of which is incorporated by reference. For example, the methods and systems described herein may be configured as a component or module of the risk management systems described in the above-referenced patent publication. Alternatively or additionally, the disclosed methods may generate data to be provided to the systems described in the above-referenced patent publication. For example, the margin requirements determined by the disclosed embodiments may be added to the margin requirement(s) determined by the other risk management method or system.

In one embodiment, the disclosed methods and systems are integrated or otherwise combined with the risk management system implemented by CME called Standard Portfolio Analysis of Risk™ (SPAN®). The SPAN system bases performance bond requirements on the overall risk of the portfolios using parameters as determined by CME's Board of Directors, and thus represents a significant improvement over other performance bond systems, most notably those that are "strategy-based" or "delta-based." Further details regarding SPAN are set forth in the above-referenced patent publication. The incorporation of the disclosed embodiments into a SPAN-based risk management system may include or involve a determination that the risk presented by an IRS position (or portfolio of positions) is offset to an extent by the risk presented by one or more non-IRS positions. In such cases, the total margin requirement may be lower than a simple addition of the constituent margin requirements.

The embodiments may be described in terms of a distributed computing system. The particular examples identify a specific set of components useful in a futures and options exchange. However, many of the components and inventive features are readily adapted to other electronic trading environments. The specific examples described herein may teach specific protocols and/or interfaces, although it should be understood that the principles involved may be extended to, or applied in, other protocols and interfaces.

It will be appreciated that the plurality of entities utilizing or involved with the disclosed embodiments, e.g. the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the Exchange.

With reference now to the drawing figures, an exemplary trading network environment for implementing trading systems and methods is shown in FIG. 1. An exchange computer system 100 receives orders and transmits market data related to orders and trades to users, such as via wide area network 126 and/or local area network 124 and computer devices 114, 116, 118, 120 and 122, as described below, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, ... and <N>" or "at least one of <A>, <B>, ... <N>, or combinations thereof" are defined by the Applicant in the broadest sense, superseding any other implied definitions hereinbefore or hereinafter unless expressly asserted by the Applicant to the contrary, to mean one or more elements selected from the group comprising A, B, ... and N, that is to say, any combination of one or more of the elements A, B, ... or N including any one element alone or in combination with one or more of the other elements which may also include, in combination, additional elements not listed.

The exchange computer system 100 may be implemented with one or more mainframe, desktop or other computers, such as the computer 400 described below in connection with FIG. 4. A user database 102 may be provided which includes information identifying traders and other users of exchange computer system 100, such as account numbers or identifiers, user names and passwords. An account data module 104 may be provided which may process account information that may be used during trades.

A match engine module 106 may be included to match bid and offer prices and may be implemented with software that executes one or more algorithms for matching bids and offers. The match engine module 106 may be in communication with one or more of the local area network 124, the wide area network 126, or other elements of the exchange computer system 100 to receive data indicative of the orders from the market participants.

A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. The risk management module 134 may also be configured to determine risk assessments or exposure levels in connection with positions held by a market participant.

The risk management module 134 may be configured to administer, manage or maintain one or more margining mechanisms implemented by the exchange computer system 100. Such administration, management or maintenance may include managing a number of database records reflective of margin accounts of the market participants. In some embodiments, the risk management module 134 implements one or more aspects of the disclosed embodiments, including, for instance, PCA-based margining in connection with IRS portfolios, as described below.

An order processing module 136 may be included to decompose delta-based and bulk order types for processing by the order book module 110 and/or the match engine module 106. The order processing module 136 may also be used to implement one or more procedures related to clearing an order.

In the example of FIG. 1, the exchange computer system 100 also includes a settlement module 140 (or settlement processor or other payment processor) to provide one or more functions related to settling or otherwise administering transactions cleared by the Exchange. Settlement-related functions need not be limited to actions or events occurring at the end of a contract term. For instance, in some embodiments, settlement-related functions may include or involve daily or other MTM settlements for margining purposes. For example, the settlement module 140 may be configured to communicate with the trade database 108 (or the memory(ies) on which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement module 140 may be used to determine a MTM amount on a daily basis during the term of the financial instrument. Such determinations may also be made on a settlement date for the financial instrument for the purposes of final settlement.

In some embodiments, the settlement module 140 may be integrated to any desired extent with one or more of the other modules or processors of the exchange computer system 100. For example, the settlement module 140 and the risk management module 134 may be integrated to any desired extent. In some cases, one or more margining procedures or other aspects of the margining mechanism(s) may be implemented by the settlement module 140.

The exchange computer system 100 may include one or more additional modules or processors, including, for instance, a volume control module configured to, among other things, control the rate of acceptance of mass quote messages. It will be appreciated that concurrent processing limits may be defined by or imposed separately or in combination, as was described above, on one or more of the trading system components, including the user database 102, the account data module 104, the match engine module 106, the trade database 108, the order book module 110, the market data module 112, the risk management module 134, the order processing module 136, or other component of the exchange computer system 100.

The trading network environment shown in FIG. 1 includes exemplary computer devices 114, 116, 118, 120 and 122, which depict different exemplary methods or media by which a computer device may be coupled with the exchange computer system 100 or by which a user may communicate, e.g. send and receive trade or other information therewith. It will be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may include a computer 400 described in more detail below with respect to FIG. 4, may include a central processor that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 114 is shown directly connected to exchange computer system 100, such as via a T1 line, a common local area network (LAN) or other wired and/or wireless medium for connecting computer devices, such as the network 420 shown in FIG. 4 and described below with respect thereto. The exemplary computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the exemplary computer device 114 or a user thereof. The user of the exemplary computer device 114, or the exemplary computer device 114 alone and/or autonomously, may then transmit the trade or other information to the exchange computer system 100.

Exemplary computer devices 116 and 118 are coupled with a local area network ("LAN") 124 which may be configured in one or more of the well-known LAN topologies, e.g. star, daisy chain, etc., and may use a variety of different protocols, such as Ethernet, TCP/IP, etc. The exemplary computer devices 116 and 118 may communicate with each other and with other computer and other devices which are coupled with the LAN 124. Computer and other devices may be coupled with the LAN 124 via twisted pair wires, coaxial cable, fiber optics or other wired or wireless media. As shown in FIG. 1, an exemplary wireless personal digital assistant device ("PDA") 122, such as a mobile telephone, tablet based compute device, or other wireless device, may communicate with the LAN 124 and/or the Internet 126 via radio waves, such as via WiFi, Bluetooth and/or a cellular telephone based data communications protocol. PDA 122 may also communicate with exchange computer system 100 via a conventional wireless hub 128.

FIG. 1 also shows the LAN 124 coupled with a wide area network ("WAN") 126 which may be comprised of one or more public or private wired or wireless networks. In one embodiment, the WAN 126 includes the Internet 126. The LAN 124 may include a router to connect LAN 124 to the Internet 126. Exemplary computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 420 shown in FIG. 4 and described below with respect thereto.

The operations of computer devices and systems shown in FIG. 1 may be controlled by computer-executable instructions stored on a non-transitory computer-readable medium. For example, the exemplary computer device 116 may include computer-executable instructions for receiving order information from a user and transmitting that order information to exchange computer system 100. In another example, the exemplary computer device 118 may include computer-executable instructions for receiving market data from exchange computer system 100 and displaying that information to a user.

Numerous additional servers, computers, handheld devices, personal digital assistants, telephones and other devices may also be connected to the exchange computer system 100. Moreover, the topology shown in FIG. 1 is merely an example and that the components shown in FIG. 1 may include other components not shown and be connected by numerous alternative topologies.

As shown in FIG. 1, the risk management module 134 of the exchange computer system 100 may implement one or more aspects of the PCA-based margining techniques of the disclosed methods and systems, as will be described with reference to FIG. 2. It will be appreciated the disclosed embodiments may be implemented as a different or separate module of the exchange computer system 100, or a separate computer system coupled with the exchange computer system 100 so as to have access to margin account record, pricing, and/or other data. As described above, the disclosed embodiments may be implemented as a centrally accessible system or as a distributed system, e.g., where some of the disclosed functions are performed by the computer systems of the market participants.

As an intermediary, the Exchange 108 bears a certain amount of risk in each transaction that takes place. To that end, risk management mechanisms protect the Exchange 108 via the Clearing House. The Clearing House establishes clearing level performance bonds (margins) for all CME products and establishes minimum performance bond requirements for customers of CME products. A performance bond, also referred to as a margin, corresponds with the funds that must be deposited by a customer with his or her broker, by a broker with a clearing member or by a clearing member with the Clearing House, for the purpose of insuring the broker or Clearing House against loss on open futures or options contracts. This is not a part payment on a purchase. The performance bond helps to ensure the financial integrity of brokers, clearing members and the Exchange as a whole. The Performance Bond to Clearing House refers to the minimum dollar deposit required by the Clearing House from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e. a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

As described below in connection with the exemplary embodiments of FIGS. 2 and 3, one or more of the modules of the Exchange computer system 100 may be configured to determine a margin requirement for a financial product portfolio involving one or more positions having a market characterized by a zero curve. In some cases, the financial product portfolio includes a number of IRS positions. A PCA-based model of the zero curve is generated based on historical return data, to which weighting factors (e.g., exponentially weighted moving average (EWMA) weighting factors) may be applied to adjust the historical return data to make near-term returns more important older returns. Such weighting may reduce portfolio over-coverage while maintaining a desired target coverage criterion (e.g., 99%). The PCA-based model, in turn, supports the deterministic production of a number of scenario curves that may then be used to determine projected gains and losses for the portfolio.

Principal component analysis is an orthogonal transformation of an original set of variables, which may be correlated to some extent, into linearly uncorrelated variables. In this case, the original variables are the daily (or other periodic) returns for each of the tenors of the financial products that may be present in the portfolio. The return data may be arranged in or represented by the zero curve, also referred to as the base curve. The tenors may be representative of the maturity date for the financial product. Because the number of tenors may be quite large, principal component analysis is useful for reducing the dimensionality of the correlation matrix (e.g., 120*120 quarters for IRS contracts). The principal component analysis may reduce the dimensionality to only a few (e.g., three) factors through eigenvalue decomposition, singular value decomposition, or other decomposition.

The PCA model transforms the original matrix of historical zero curve returns $X(i, j)$ into an orthogonal space of principal components or factors P, such that $P=X*W$ and $P'*P=V$, where V is the eigenvalue matrix of P and is indicative of the factor variation;

W is the eigenvector orthogonal matrix of factor sensitivities;

i is the index for the day during the period of returns (e.g., in a five year period, the index i runs from 1 to 1260); and j is the index for the tenor (or maturity) of the zero curve (e.g., the index j may run from 1 to 1120 for forty years worth of quarters). The eigenvectors and eigenvalues may represent the sensitivities and volatilities used to produce the hypothetical scenarios.

In some embodiments, the first three significant factors of the PCA model are used to produce the scenario curves. The first three significant factors are representative of trend (or level), tilt (or slope), and shape (or curvature). Additional factors may be used. The volatility of each factor in the model may then be independently or separately varied, shocked, or otherwise offset to produce the hypothetical scenario curves. For each scenario curve, one of the factors may be varied or offset in the eigenvalue matrix V to a desired extent. For example, the factor may be varied or offset by an amount that falls within a range from about two to about four standard deviations of the variation (or distribution) for that factor. Each factor itself has a variance, the square root of which is the standard deviation. As described below, the independent or separate variation of the factors of the PCA model helps to keep the number of scenario curves at a manageable level.

Figure 7:
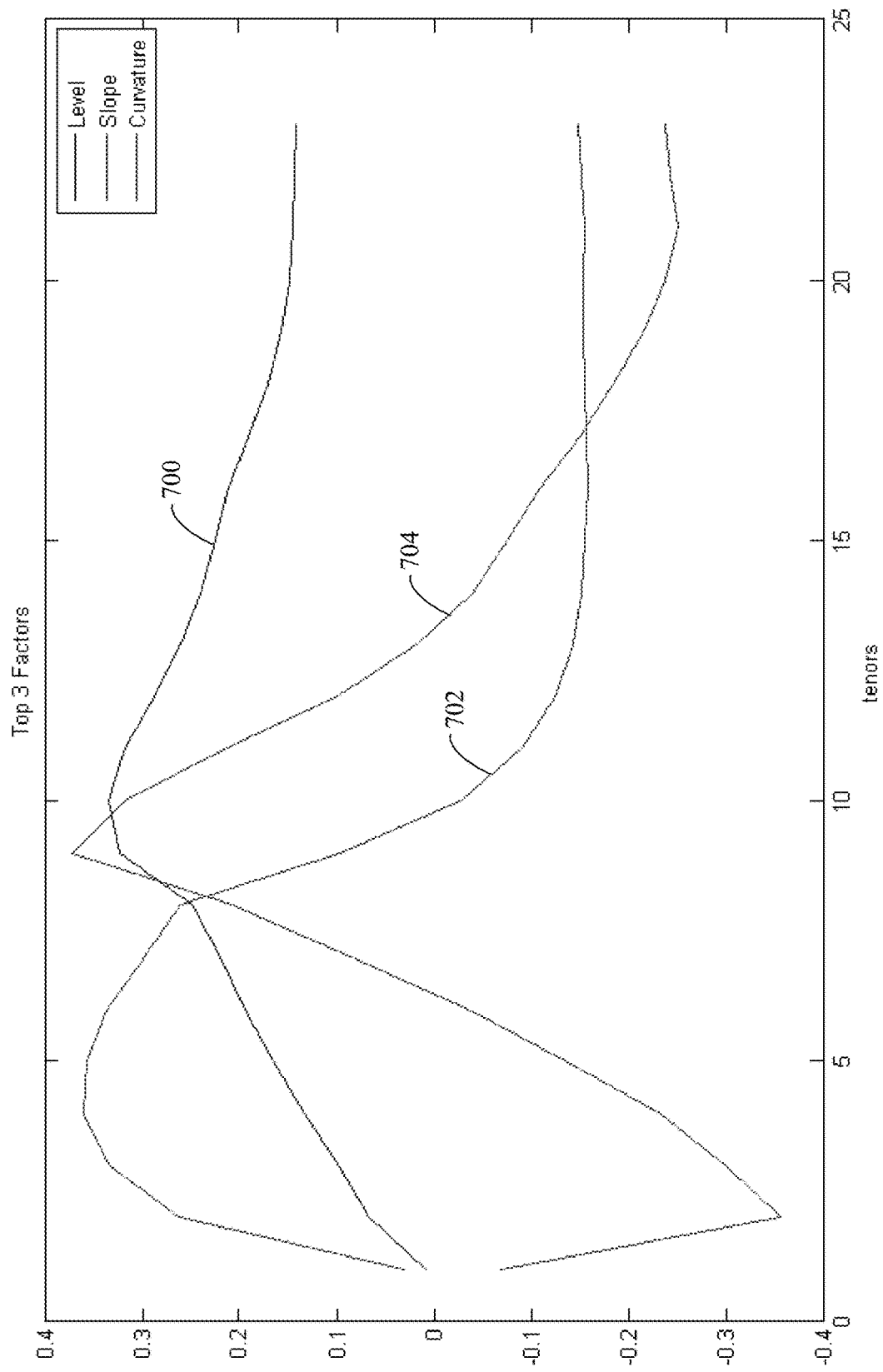
FIG. 7 is a graphical plot depicting exemplary weights of a three-factor PCA model in accordance with one embodiment.

The hypothetical scenario curves are produced from the orthogonal factors of the PCA model as follows:

$$\text{Scenario Curve} = \text{Base Curve} * \exp(W * \text{sqrt}(V) * \text{Factor Weight}),$$

where the base curve is the current zero curve, and the factor weights are factor-specific parameters, which may be calibrated or otherwise predetermined through, e.g., back testing of the PCA model. FIG. 7 shows exemplary factor weights for a three-factor model. For each scenario curve, the variance V may be set to a level to reach a desired offset for the corresponding PCA factor. The desired offset may fall in a range from about two standard deviations to about four standard deviations of a mean value for the PCA factor. For example, the shocks or desired offsets may range over nine levels, namely −4, −3, −2, −1, 0, 1, 2, 3, and 4, of the standard deviation. In one embodiment, equal and opposite offsets are used to generate a pair of curves for each PCA factor. The offsets may be uniform across the factors.

Once the hypothetical scenario curves are produced, loss risk data for a given portfolio may be calculated. The current value of the portfolio is calculated based on the current or base zero curve. A hypothetical value of the portfolio is calculated based on a respective one of the scenario curves. Loss risk data for each scenario curve may then be calculated by calculating the difference between the current and hypothetical values. Scenario curves resulting in a gain for the portfolio may be disregarded. The loss risk data may be factor-specific, e.g., specific to the offset PCA factor.

A margin for each PCA factor may be calculated by taking the absolute value of the loss risk data for each factor. The factor-specific margins may thus be representative of a portion of the maximum hypothetical loss of each portfolio. The factor-specific margins may not be symmetric from the points of view of the buyer and seller. The margin requirement for the portfolio is then determined as the sum of the factor-specific margins.

The scenario curves produced via the disclosed embodiments may reduce over-coverage without falling below a desired level of coverage (e.g., 99%), as well as account for volatility changes automatically (e.g., without forcing a user to additionally forecast a volatility regime change). These benefits may be provided despite a reduction in the number of PCA factors relied upon in the margin determination process as described below.

In some cases, the number of factors in the PCA model may be sufficient to cover a desired fraction (e.g., 99%) of the variation presented by the historical zero curve returns, but insufficient to handle the additional variability presented by a specific portfolio at the same level of protection (e.g., 99%). For example, a three-factor PCA model may not adequately cover the variation introduced via portfolio sensitivities (e.g., to a particular tenor). For instance, a portfolio may have multiple positions within a particular tenor. The value at risk increasingly becomes dependent on the portfolio sensitivity, or PV01. To address such sensitivities, additional factors may be incorporated into the PCA model. In an example attempting to achieve 99% coverage, the PCA model may include nine factors. However, with all nine factors, the number of scenarios could be large enough to be prohibitive in computation time and/or cost.

The number of scenarios may be limited to more reasonable computation times and costs by optimizing (e.g., reducing) the number of factors within the PCA model from the level associated with 99% portfolio coverage. Therefore, in some embodiments, the number of factors in the PCA model is reduced from the level required for 99% portfolio coverage. The PCA model may thus be referred to as factor-deficient.

The contribution from each factor for a portfolio may be calculated as a ratio of Portfolio Factor variance over Total Portfolio Factor variance. Portfolio Factor variance may be calculated as a function of the Position PV01 in each maturity j, the factor sensitivity, and the factor volatility. The number of significant factors ($N_s$) may then be calculated as the minimum number of factors needed to meet the performance bond coverage target of 99%, as set forth below:

$N_s = \min n \rightarrow \text{Sum } C_j \geq 0.99$
  $j=1, n$
where Portfolio Factor (j) Contribution to total variance is
  $C_j = W_j / \text{Sum } W_j$
  $i=1, N$
and Portfolio Factor (i) variation is
  $W_j = \text{Sum } (PV01(i) * F_{ij})^2 * V_j$
  $i=1, M$
  where $F_{ij}$ is the matrix of factor (j) sensitivities (eigenvector) to the zero curve in maturity i, $V_j$ is the factor j variation, and PV01(i) is the position duration in maturity i=1,M.

While back testing of the PCA model demonstrated that nine factors are sufficient number to satisfy the 99% target, the number of factors used in the PCA model may be further reduced to the first three significant factors, i.e., level, slope, and curvature significant factors, which cover 99% variation in zero curve historical shocks. To compensate for such factor reduction and possible margin under-coverage due to portfolio sensitivities arising from the deficiency of the PCA model, in certain circumstances, the margin requirement is adjusted through the addition of a reserve charge. The circumstances or conditions under which the reserve charge is added may address when the nature of the portfolio may be likely to increase risk. The reserve charge may be empirically based as described below.

Figure 2:
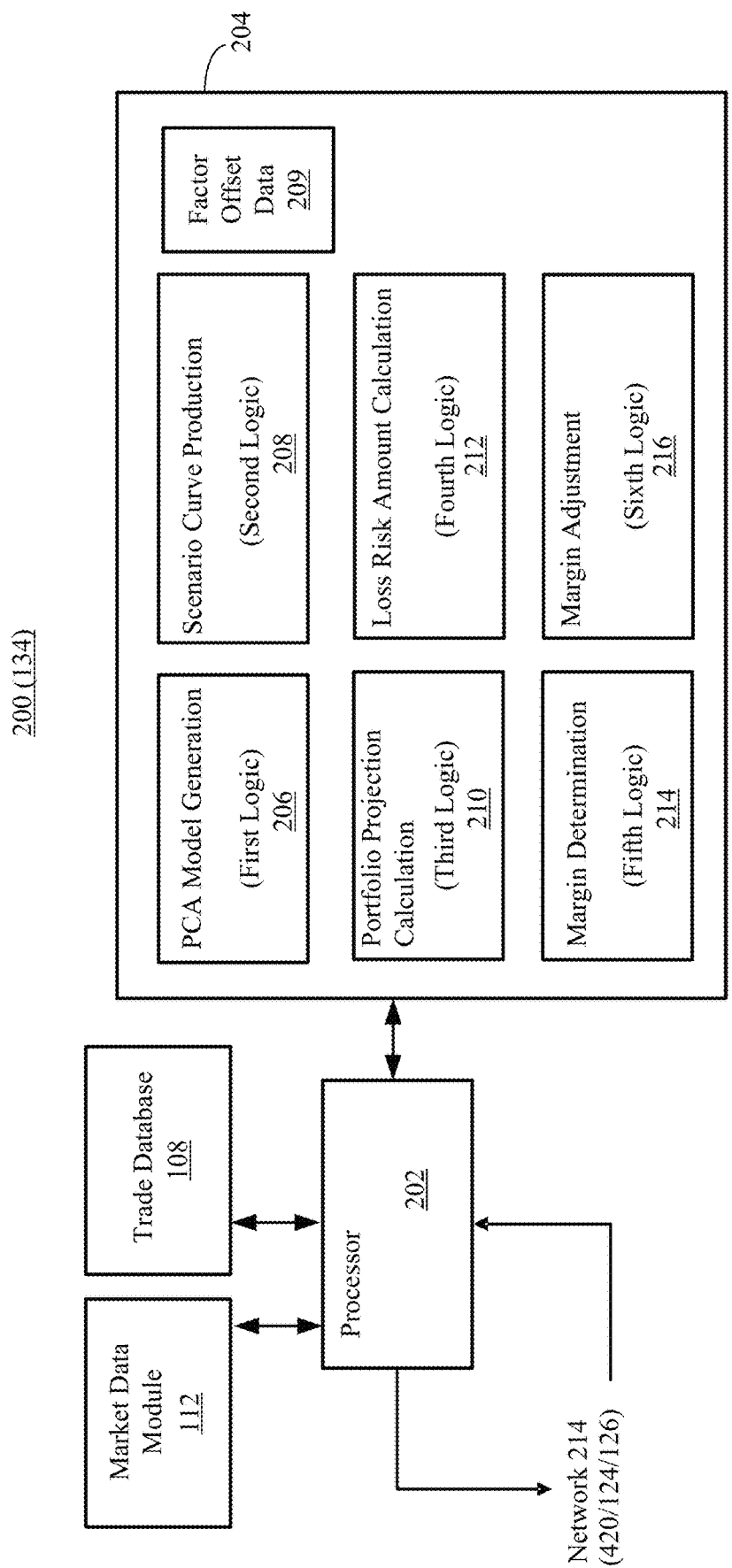
FIG. 2 is a block diagram of an exemplary system for determining a margin requirement for an IRS contract or other financial product (or product portfolio) in accordance with one embodiment.

FIG. 2 depicts a block diagram of a system 200 operative to determine a margin requirement for a financial product portfolio. Market conditions for the financial product portfolio are characterized by a zero curve. The financial product portfolio may be part of a broader portfolio having any number of positions involving other types of financial products (e.g., products for which market conditions are not characterized by a zero curve). In some embodiments, the system 200 may correspond with, or implement, the risk management module 134 and/or other module of the exchange computer system 100. The system 200 may thus be implemented as part of the exchange computer system 100 described above.

One or more of the above-described modules of the Exchange computer system 100 may be used to gather or obtain data to support the margin requirement determination by the system 200. For example, the market data module 112 may be used to receive, access, or otherwise obtain historical return data. The trade database 108 may be used to receive, access, or otherwise obtain data indicative of the current positions within the portfolio of a market participant.

The system 200 includes a processor 202 and a memory 204 coupled therewith which may be implemented as a processor 402 and memory 404 as described below with respect to FIG. 4. The system 200 further includes first logic 206 stored in the memory 204 and executable by the processor 202 to cause the processor 202 to generate a PCA model of the zero curve. The PCA model includes a set of PCA factors. The set may include only the three most significant factors (level, slope, and curvature), even if not including any further factors into the model may result in insufficient coverage for all portfolios absent the incorporation of a reserve charge as described herein. The PCA model may thus be a factor-deficient model of portfolios characterized by the zero curve. Additional factors may be incorporated into the model in other embodiments, regardless of whether the reserve charge is used to adjust the margin requirement.

The first logic 206 may configure the processor 402 to apply weights to decay the historical return data (e.g., log return data). To generate a matrix of decayed returns, the log return data may be scaled by weighting factors. The weighting factors may vary such that more recent return data is weighted more heavily than less recent return data. The PCA model may accordingly be most reactive to, or reflective of, the most recent volatility or returns. In one embodiment, an exponentially weighted moving average (EWMA) decay is applied to the historical return data. Weights of the EWMA decay that decrease exponentially as the data gets older are applied to the historical return data. Other moving average, time series, or decay techniques may be used.

The first logic 206 may then process the decayed return matrix to generate the PCA model. The PCA factors, eigenvectors, and eigenvalues of a covariance matrix for the zero curve may be generated.

One example of the application of an EWMA decay of an original log returns matrix X to produce decayed matrix X is as follows.

$$X(i,j)=X(i,j)*\exp(-i/\text{tau})*w(i)$$

where— i represents a look back observation from a 5 year historical period T (i=1,1260);

tau represents a decay rate (which may be set in back testing to, e.g., 252, which is equivalent to a risk metrics EWMA lambda of 96.1%); and w(i) equals the sqrt (T/SUM exp(-i/tau)$^2$ are weights chosen to satisfy the following normalization condition:

$$\text{SUM}(\exp(-i/\text{tau})*w(i))^2/T=1$$

The system 200 further includes second logic 208 stored in the memory 204 and executable by the processor 202 to cause the processor 202 to produce a plurality of scenario curves. Each scenario curve reflects the PCA model of the zero curve with a respective one of the plurality of PCA factors offset from a corresponding base value for the zero curve. The other PCA factors may not be offset from their corresponding base values. Alternatively, one or more of the other PCA factors are offset from their base values.

In one embodiment, a pair of scenario curves is produced for each PCA factor. For example, one of the scenario curves may be produced for a positive offset from the base value, while the other scenario curve may be produced for an equal and opposite (or negative) offset from the base value. Fewer or additional scenario curves may be produced.

The magnitude of the offsets reflects the severity of the shock applied to the PCA model of the zero curve. The magnitude of the offsets may vary across the PCA factors. In some embodiments, the offset for each PCA factor falls in a range from about two to about four standard deviations of the distribution of the PCA factor.

The offset magnitude(s) may be selected or predetermined by a user of the system 200. For example, the second logic 208 may be executable to cause the processor 202 to generate a user interface to obtain the offset magnitude(s). Alternatively or additionally, the system 200 obtains the offset magnitude(s) automatically in connection with back testing of the PCA model. In this embodiment, data indicative of the offsets is stored in the memory 204 in a data structure 209.

The system 200 further includes third logic 210 stored in the memory 204 and executable by the processor 202 to cause the processor 202 to calculate a respective projected value of the financial product portfolio for each scenario curve. Once the scenario curves are produced, each scenario curve may be used to calculate a respective projected or hypothetical value of the financial product portfolio.

The system 200 further includes fourth logic 212 stored in the memory 204 and executable by the processor 202 to cause the processor 202 to calculate a loss risk amount for each PCA factor. The loss risk amount is calculated based on the respective projected and current values of the financial product portfolio. For example, the projected value may be subtracted from the current value to calculate the loss risk amount.

In embodiments having a pair of scenario curves for each PCA factor, the fourth logic 212 may be further executable by the processor 202 to determine gain and loss amounts for each PCA factor based on the pair of scenario curves. One of the scenario curves results in a gain, while the other results in a loss. Taking the absolute value of the loss may be used to calculate the loss risk amount for each PCA factor. Each loss risk amount is specific to a particular PCA factor and may thus be considered to be representative of a factor-specific margin.

The system 200 further includes fifth logic 214 stored in the memory 204 and executable by the processor 202 to cause the processor 202 to determine the margin requirement based on a sum of the loss risk amounts for the plurality of PCA factors. The factor-specific margins are summed to arrive at the margin requirement.

In the embodiment of FIG. 2, the system 200 further includes sixth logic 216 stored in the memory 204 and executable by the processor 202 to cause the processor 202 to adjust the margin requirement in certain circumstances. The sixth logic 216 causes the processor 202 to calculate a reserve charge for each tenor in the financial product portfolio when a reserve condition is satisfied. The processor 202 then adds the reserve charge to the sum of the loss risk amounts to adjust (increase) the margin requirement. The sixth logic 216 may specify one or more reserve conditions. In one example, the reserve condition is met if the portfolio is such that a ratio of a net notional amount to a gross notional amount is less than or equal to a first threshold, or if the portfolio has a gross weighted average maturity (WAM) is greater than a second threshold, or if a net WAM of the portfolio is less than or equal to a third threshold. Fewer, alternative, or additional reserve conditions may be used.

In the event one or more of the reserve conditions is met, then the sixth logic 216 may be configured to cause the processor 202 to scale a charge parameter by a price sensitivity of the tenor and an empirical scale factor. The contribution of each of the high order (or less significant) factors (e.g., higher than the third factor) to total variation in a particular zero curve tenor (i) may be expressed as a charge parameter per basis point as follows:

$$\text{Charge}(i) = \sqrt{\text{Sum} V_j * F_{ij}^2}$$

$$j = 4, N$$

The portfolio reserve charge may thus be based on the factor sensitivity matrix of the PCA model and the offsets in the PCA factors used to determine the set of scenario curves.

The portfolio reserve charge may have two components. The first component is time-dependent, while the second component is portfolio-dependent. In some embodiments, the portfolio reserve charge in tenor (i) may be expressed using above the charge for tenor (i), the price sensitivity or PV01 duration in tenor (i), and a reserve scale parameter to target 99% coverage as follows:

$$\text{Reserve Charge}(i) = \text{Charge}(i) * PV01(i) * \text{Scale}$$

Figure 8:
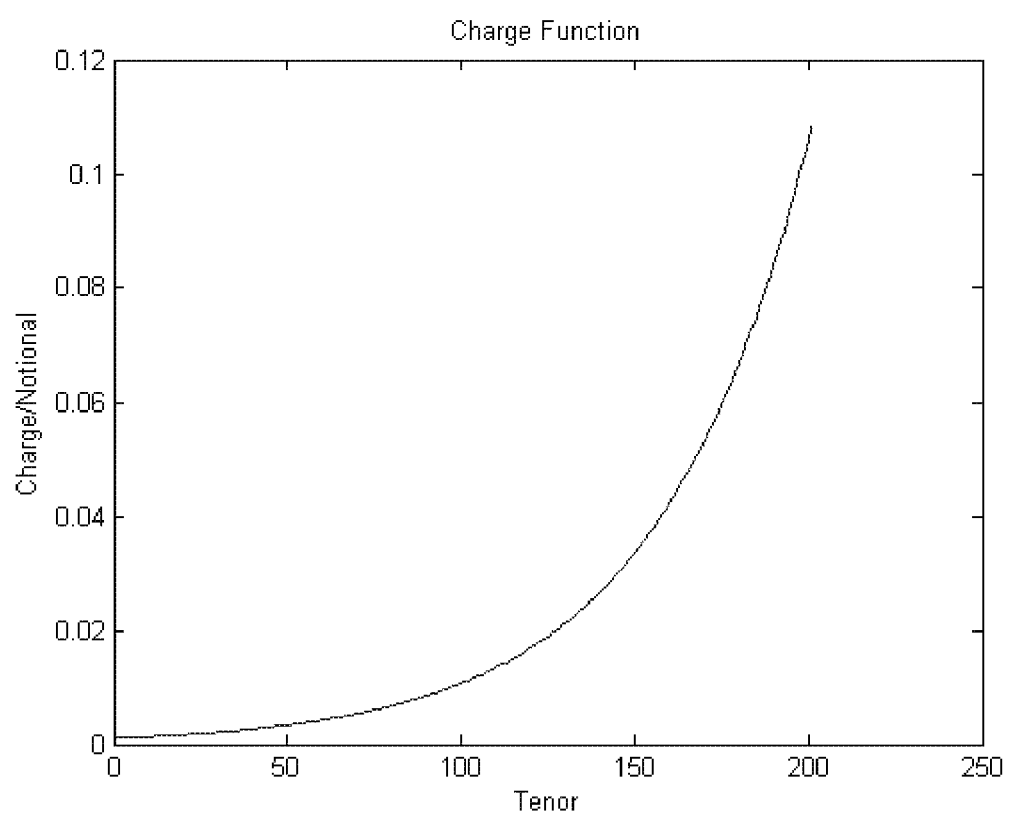
FIG. 8 is a graphical plot depicting an exemplary charge function for incorporating a reserve charge into a margin requirement determination based on a factor-deficient PCA model in accordance with one embodiment.

Based on the results of back testing of the PCA model, it was found that the charge may be approximated as an exponential function of time to maturity. An exemplary function is shown in FIG. 8.

The portfolio reserve charge may be applied on a trade-by-trade or position-by-position basis when one or more conditions are met. The portfolio reserve charge may be applied on a trade level to have portfolio netting benefits. For instance, a spread portfolio with two positions, one long in tenor x and one short in tenor y, would have a netting benefit because the PV01 in tenors x and y have different signs.

In one embodiment, the portfolio reserve charge is applied in the following conditions:
the absolute value of the ratio of Net Notional to Gross Notional is less than or equal to 0.4;
the gross weighted average maturity (WAM) is greater than or equal to 15; and
the absolute value of the net WAM is less than or equal to 1.

The reserve charge for a particular tenor may then be added to the margin requirement for a portfolio that falls in any of the above categories.

The above-described logic may be arranged in any number of modules or other logic units. For example, the sixth logic 216 may be integrated with the fifth logic 214 to any desired extent. The fourth logic 212 and the fifth logic 214 may be integrated to any desired extent. Fewer, alternative, or additional logic units may be included.

Figure 3:
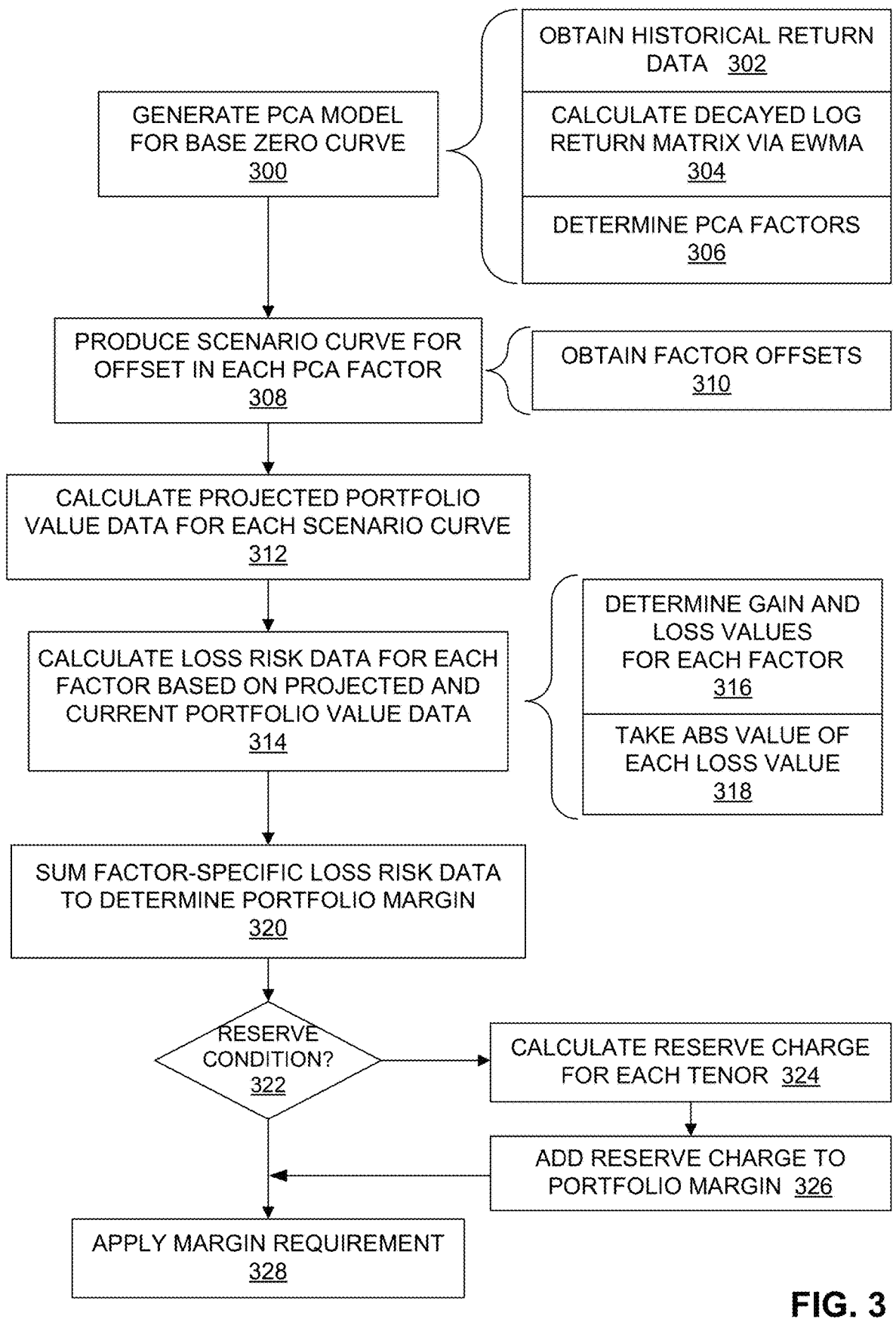
FIG. 3 is a flow chart diagram of an exemplary method for determining a margin requirement for an IRS contract or other financial product (or product portfolio) in accordance with one embodiment.

Referring to FIG. 3, a computer implemented method is configured in accordance with one embodiment to determine a margin requirement for a financial product portfolio. Market conditions for the financial product portfolio are characterized by a zero curve, or base zero curve, as described above. The computer-implemented method may be implemented to any desired extent by the system 200 of FIG. 2, the system described in connection with FIG. 4, the processor 202 (FIG. 2), and/or any other processor. In some cases, the method is implemented by an exchange. Alternatively, the method is implemented by a market participant or other entity for which the margin requirement may be representative of a value at risk (or potential value at risk).

The computer implemented method may begin with the generation (block 300) of a PCA model for the zero curve. The PCA model may be generated from historical return data, which may be selected, received, or otherwise obtained (block 302). The PCA model may be based on log return data. In the embodiment of FIG. 3, a decayed log return matrix is calculated (block 304) via an EWMA procedure. A number of PCA factors may then be determined (block 306) based on the decayed log return matrix.

The PCA model may include the three most significant PCA factors, namely level, slope, and curvature. Thus, in some cases, the PCA model does not include PCA factors beyond level, slope, and curvature. The PCA model may thus be configured as a factor-deficient model, as described above.

In some cases, the PCA model and factor data thereof may already be generated. Once the PCA model is available, the PCA model may be used any number of times as representative of a base curve from which scenario curves are later produced. For example, the PCA model may be generated daily. Alternatively, the PCA model may be generated (and thus updated) once per week or at some other interval. The scenario curves and subsequent margin requirements may use the PCA model as the base curve throughout the week or other base curve interval. In some embodiments, the PCA model may be used for margining the portfolios of multiple market participants.

A plurality of scenario curves are produced (block 308). Each scenario curve is based on the PCA model of the zero curve (or base curve). Each scenario curve then reflects an offset in a respective one of the PCA factors. The respective factor is offset from a corresponding base value for the zero curve, while the other PCA factors are not offset for the scenario curve. Each scenario curve may thus be indicative of a factor-specific shocking of the zero curve. The offset(s) may be obtained (block 310) in a variety of ways, including a dedicated user interface and/or via access to a data structure. The offset for each PCA factor may fall in a range from about two to about four standard deviations of a distribution of the PCA factor, as described above.

A pair of scenario curves may be produced for variation in each PCA factor. Each PCA factor may thus be varied by an equal and opposite offset. One scenario curve may have a positive offset, while another scenario curve may have a negative offset.

A respective projected value of the financial product portfolio is calculated (block 312) for each scenario curve of the plurality of scenario curves, as described above. A loss risk amount for each PCA factor may then be calculated (block 314) based on the respective projected value and a current value of the financial product portfolio. Each loss risk amount may be calculated by determining (block 316) gain and loss amounts for each PCA factor based on the pair of scenario curves, and by taking (block 318) the absolute value of the loss amount. A margin requirement for the portfolio is determined (block 320) based on a sum of the loss risk amounts for the plurality of PCA factors.

The margin requirement determination may include an adjustment based on a reserve charge calculation. In the embodiment of FIG. 3, a decision block 322 determines whether one or more reserve conditions is present, satisfied, or applicable to the portfolio (or a position therein). If yes, then control passes to a block 324 in which a reserve charge is calculated for each tenor in the portfolio for which the reserve condition is satisfied. The reserve charge(s) are then added (block 326) to the sum of the loss risk amounts to adjust the margin requirement. If none of the reserve conditions is met, then control passes to a block 328 in which the margin requirement is enforced or otherwise applied to the portfolio.

The reserve conditions may vary. As described above, some reserve conditions may be based on whether a ratio of a net notional to a gross notional is less than or equal to a first threshold, whether a gross WAM is greater than a second threshold, or whether a net WAM is less than or equal to a third threshold.

Calculating the reserve charge for each tenor may include scaling a charge parameter by a price sensitivity of the tenor and an empirical scale factor. The charge parameter may be based on a factor sensitivity matrix of the PCA model and offsets in the PCA factors used to determine the plurality of scenario curves, as described above.

The application of the margin requirement may include crediting or debiting an account of a market participant, generating an alert or other message regarding a margin call or other margin requirement update, and/or incorporating the margin requirement into another margin requirement for a broader portfolio. For example, the margin requirement determined in accordance with the disclosed embodiments may relate to the IRS contracts within a portfolio that also includes other, non-IRS derivative positions. The margin requirements for such other derivative positions may be determined via other procedures, such as those described in the above-referenced patent publication.

Figure 4:
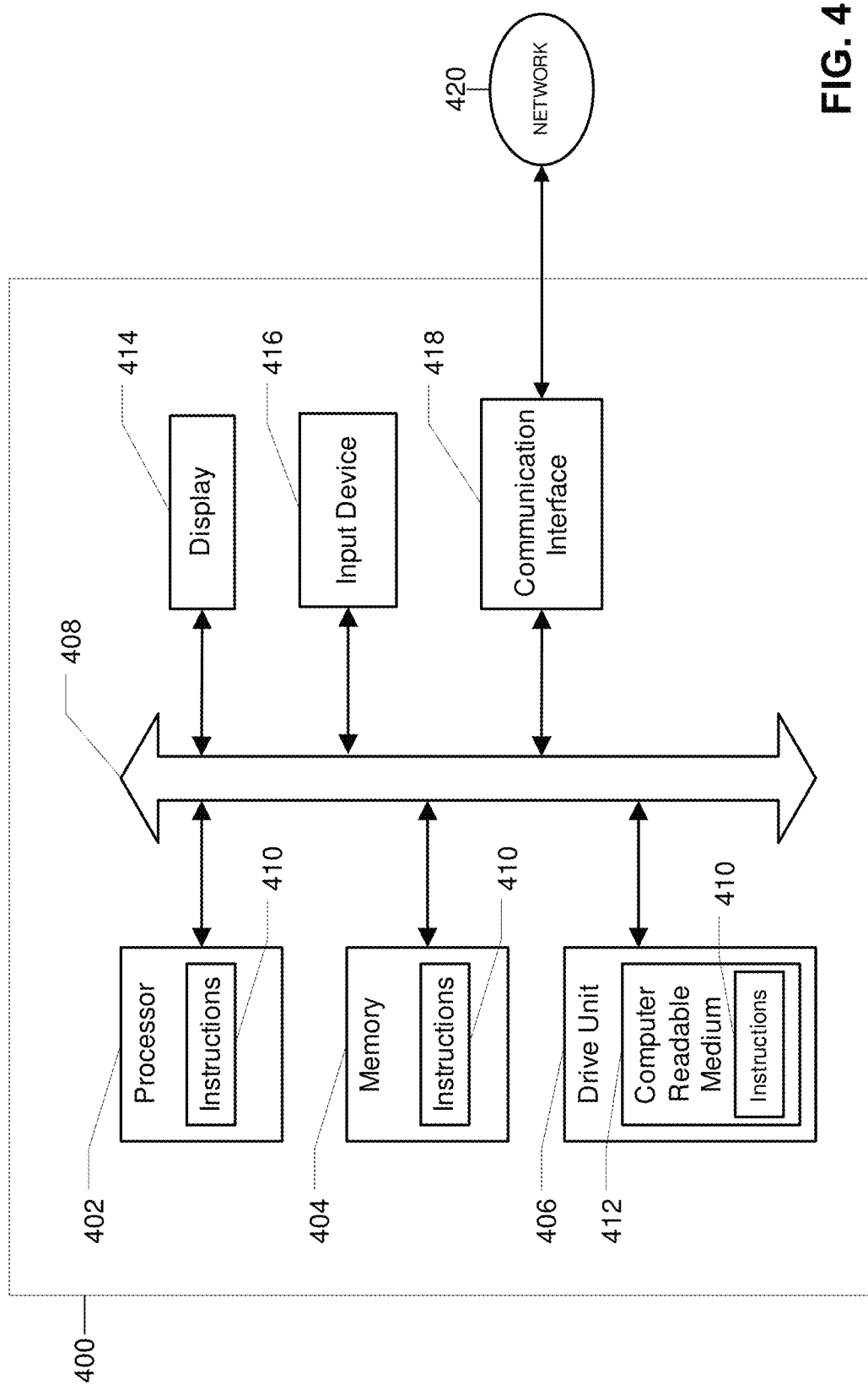
FIG. 4 shows an illustrative embodiment of a general computer system for use with the system of FIG. 1 and/or the system of FIG. 2 and/or for implementing the method of FIG. 3.

Referring to FIG. 4, an illustrative embodiment of a general computer system 400 is shown. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices. Any of the components discussed above may be a computer system 400 or a component in the computer system 400. The computer system 400 may implement a match engine on behalf of an exchange, such as the Chicago Mercantile Exchange, of which the disclosed embodiments are a component thereof.

In a networked deployment, the computer system 400 may operate in the capacity of a server or as a client user computer in a client-server user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The computer system 400 may include a memory 404 that can communicate with a drive unit 406 and other components of the system 400 via a bus 408. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 404 includes a cache or random access memory for the processor 402. In alternative embodiments, the memory 404 is separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data.

The memory 404 is operable to store instructions 410 executable by the processor 402. The functions, acts or tasks illustrated in the figures or described herein may be performed by the programmed processor 402 executing the instructions 410 stored in the memory 404. The instructions 410 may be loaded or accessed from a computer-readable storage medium 412 in the drive unit 406 or other data storage device. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 400 may further include a display unit 414, such as a liquid crystal display (LCD), an organic light emitting diode (OLED), a flat panel display, a solid state display, a cathode ray tube (CRT), a projector, a printer or other now known or later developed display device for outputting determined information. The display 414 may act as an interface for the user to see the functioning of the processor 402, or specifically as an interface with the software stored in the memory 404 or in the drive unit 406.

Additionally, the computer system 400 may include an input device 416 configured to allow a user to interact with any of the components of system 400. The input device 416 may be a number pad, a keyboard, or a cursor control device, such as a mouse, or a joystick, touch screen display, remote control or any other device operative to interact with the system 400.

In a particular embodiment, as depicted in FIG. 4, the computer system 400 may also include an optical or other disk drive unit as the drive unit 406. The disk drive unit 406 may include the computer-readable storage medium 412 in which one or more sets of instructions 410, e.g. software, can be embedded. Further, the instructions 410 may embody one or more of the methods or logic as described herein. In a particular embodiment, the instructions 410 may reside completely, or at least partially, within the memory 404 and/or within the processor 402 during execution by the computer system 400. The memory 404 and the processor 402 also may include computer-readable storage media as discussed above.

The present disclosure contemplates a computer-readable medium that includes instructions 410 or receives and executes instructions 410 responsive to a propagated signal, which may be received via a communication interface 418. The system 400 may be connected to a network 420 to communicate voice, video, audio, images or any other data over the network 420. Further, the instructions 412 may be transmitted or received over the network 420 via a communication interface 418. The communication interface 418 may be a part of the processor 402 or may be a separate component. The communication interface 418 may be created in software or may be a physical connection in hardware. The communication interface 418 is configured to connect with a network 420, external media, the display 414, or any other components in system 400, or combinations thereof. The connection with the network 420 may be a physical connection, such as a wired Ethernet connection or may be established wirelessly as discussed below. Likewise, the additional connections with other components of the system 400 may be physical connections or may be established wirelessly.

The network 420 may include wired networks, wireless networks, or combinations thereof. The wireless network may be a cellular telephone network, an 802.11, 802.16, 802.20, or WiMax network. Further, the network 420 may be a public network, such as the Internet, a private network, such as an intranet, or combinations thereof, and may utilize a variety of networking protocols now available or later developed including, but not limited to TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the terms "computer-readable medium" and "computer-readable storage medium" include a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer-readable storage medium may be or include a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

The disclosed computer programs (also known as a program, software, software application, script, or code) can be written in any form of programming language, including compiled or interpreted languages. The disclosed computer programs can be deployed in any form, including as a standalone program or as a module, component, subroutine, or other unit suitable for use in a computing environment. Such computer programs do not necessarily correspond to a file in a file system. Such programs can be stored in a portion of a file that holds other programs or data (e.g., one or more scripts stored in a markup language document), in a single file dedicated to the program in question, or in multiple coordinated files (e.g., files that store one or more modules, sub programs, or portions of code). Such computer programs can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor may receive instructions and data from a read only memory or a random access memory or both. The essential elements of a computer are a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Further details regarding PCA-based portfolio margining in accordance with the disclosed embodiments are set forth below in connection with several examples.

Figure 5:
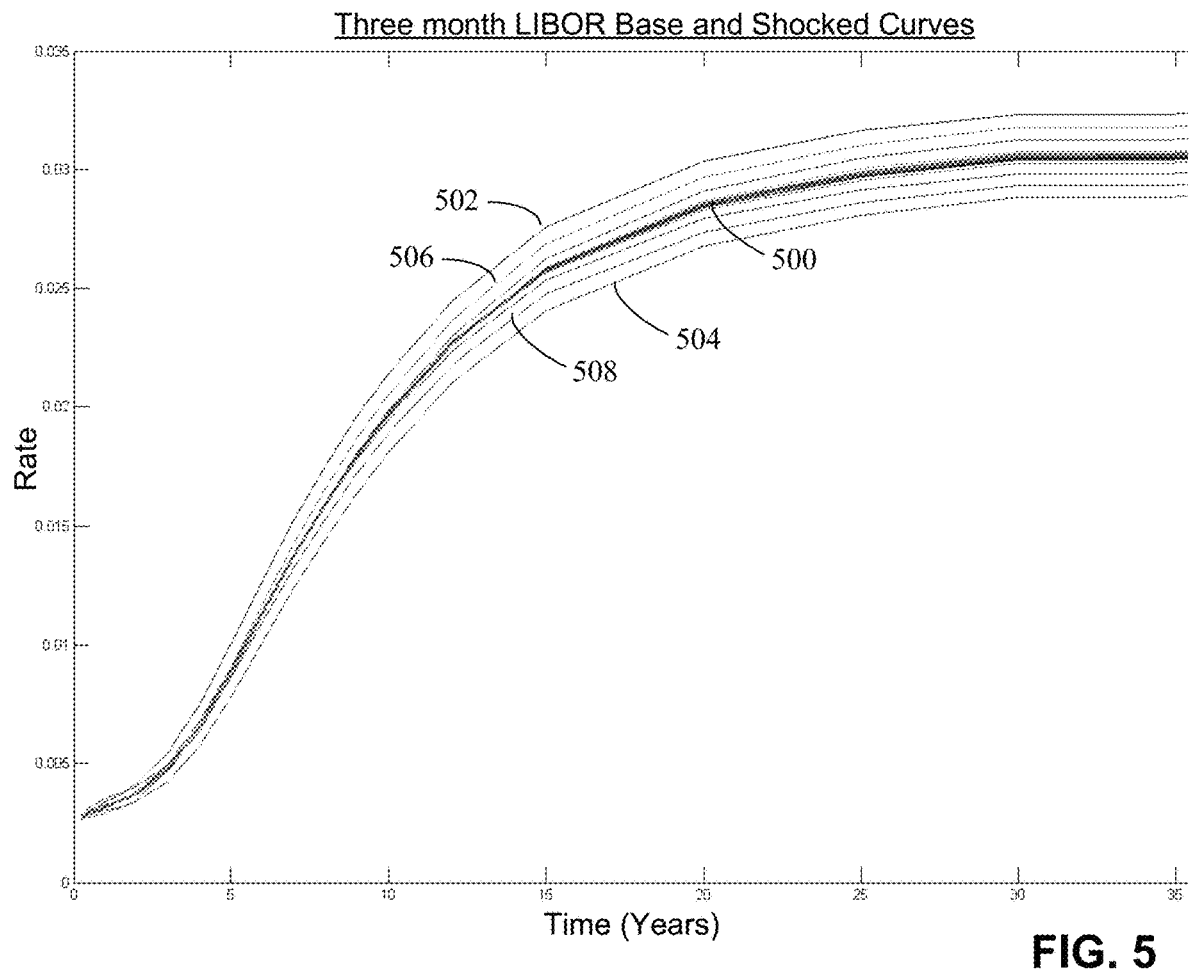
FIG. 5 is a graphical plot depicting an exemplary zero month curve for three-month LIBOR IRS contracts and a corresponding set of shocked or scenario curves in accordance with one embodiment.

FIG. 5 depicts a set of zero curves for margining a portfolio of three-month LIBOR positions in accordance with the disclosed embodiments. A PCA model is generated for a base curve 500 as described herein. The base curve 500 is representative of the current value of positions in the portfolio based on the three-month LIBOR rates. The PCA model is then shocked to produce scenario curves for a set of hypothetical scenarios. In this example, scenario curves 502, 504 are produced when a level factor of the PCA model is varied or offset from a base or median value for the base curve 500. The scenario curve 502 may result from a positive offset, while the scenario curve 504 may result from a negative offset. Scenario curves 506, 508 are produced when a slope factor of the PCA model is varied or offset.

Figure 6:
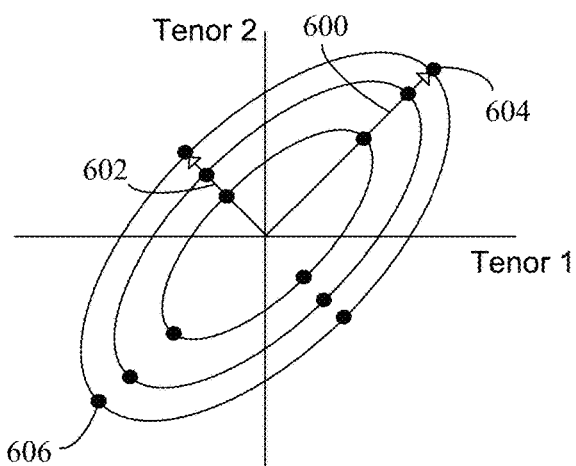
FIG. 6 is a graphical plot depicting a simplified example of a PCA factor-based technique for generating scenario curves in accordance with one embodiment.

FIG. 6 depicts a simplified representation of a distribution of returns (e.g., log returns) that has been decomposed into PCA components or factors of a PCA model. The distribution is simplified in the sense that only two tenors, tenor 1 and tenor 2, are shown to allow the distribution to be presented as a two-dimensional plot. In reality, the dimensionality of the original space presented by all the tenors is much higher (e.g., 23 tenors).

The PCA model is also simplified, in the sense that only two factors are shown. A first factor has an axis 600 and a second factor has an axis 602. In a non-simplified example, the PCA model has one or more additional factors, but nonetheless reduces the dimensionality of the original tenor space significantly (e.g., from 23 to 3). The first and second factors may correspond with the level and slope factors of the PCA model.

The PCA model is configured such that the distribution of data points in the tenor space can be represented in the factor space. In this example, a number of data points are shown for different offsets from a base point (depicted as the origin). Each data point is disposed along one of the axes 600, 602. Each offset is one of a pair of offsets that may be used to produce a pair of scenario curves for the margin requirement determination. For example, offsets 604, 606 may be used to produce the curves 502, 504 of FIG. 5. Because the offsets 604, 606 vary the first factor along the axis 600 independently of the second factor, each scenario curve is factor-specific as described above. Offsets located farther out on the axes 600, 602 are representative of larger shocks. Selection of the offsets 604, 606 is deemed to be sufficiently representative of the entire distribution for purposes of margin coverage.

FIG. 7 depicts respective plots of the weights or sensitivities of the three most significant factors of a PCA model generated in accordance with one embodiment. A first plot 700 shows the weights of the level factor. A second plot 702 shows the weights of the slope factor. A third plot 704 shows the weights of the curvature factor.

FIG. 8 depicts a charge function that may be used to support the optimization (or reduction) of factors in the PCA models relied upon by the disclosed embodiments. In this embodiment, the charge function is an exponential function of the tenor or maturity of a position within the portfolio. The charge function may be scaled as described above to calculate a reserve charge used to adjust the margin requirement determined based on a factor-deficient PCA model.

Figure 9A:
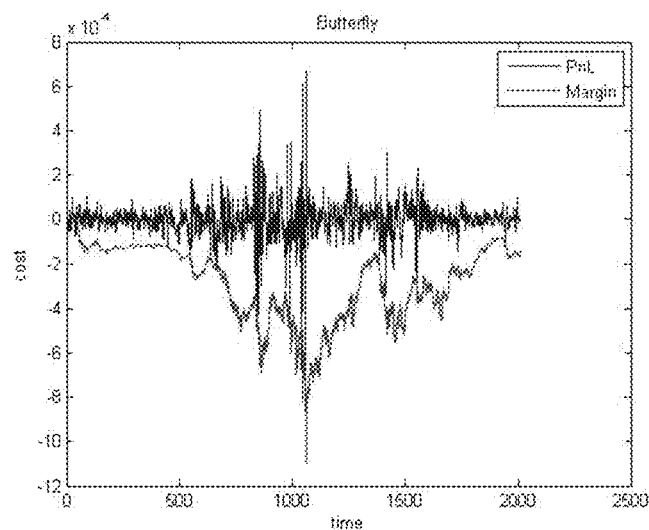
FIGS. 9A-9C are graphical plots depicting margin requirements resulting from implementing PCA-based margining in accordance with one embodiment.
Figure 9B:
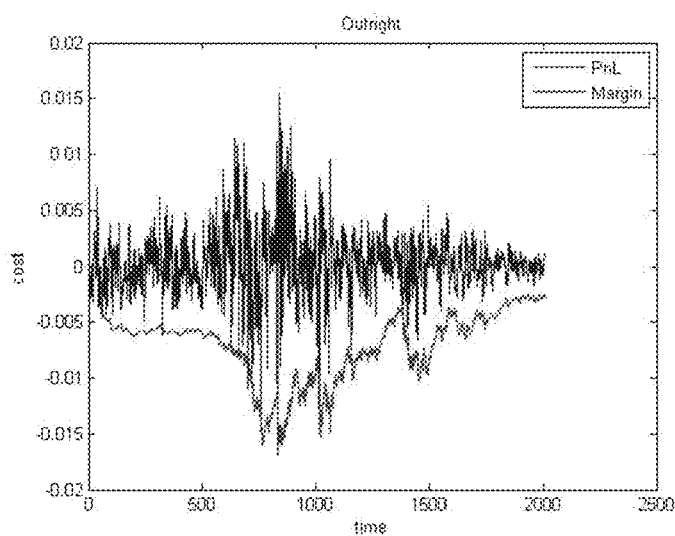
Figure 9C:
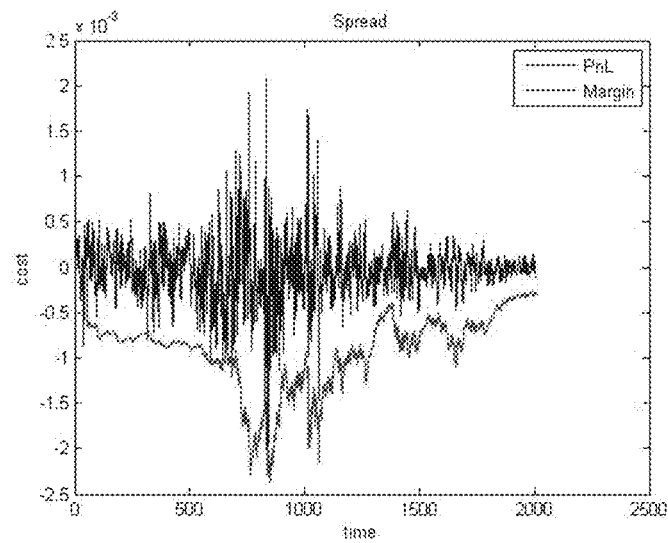

FIGS. 9A-9C depict three back tests of one embodiment in connection with three exemplary portfolios. FIG. 9A shows the historical profits and losses ("PnL") of a butterfly portfolio. FIG. 9B shows the historical PnL of an outright portfolio. FIG. 9C shows the historical PnL of a spread portfolio. In each case, the PCA-based margin requirement is shown to cover the losses that would have been incurred by the portfolio.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method for determining a margin requirement for a financial product portfolio, wherein market conditions for the financial product portfolio are characterized by a zero curve, the computer implemented method comprising:

producing, with a processor, a plurality of scenario curves, each scenario curve being produced from a number of principal component analysis (PCA) factors for the zero curve, the number of PCA factors being factor-deficient, wherein producing the plurality of scenario curves comprises producing a pair of scenario curves for each PCA factor of the number of PCA factors by varying the PCA factor by a positive offset and a negative offset independently of the other PCA factors of the number of PCA factors such that the other PCA factors are not offset;

calculating a respective projected value of the financial product portfolio for each scenario curve of the plurality of scenario curves;

calculating, for each PCA factor, a factor-specific loss risk amount based on the projected values calculated for the pair of scenario curves produced for the PCA factor; and determining the margin requirement based on a sum of the factor-specific loss risk amounts for the number of PCA factors.

2. The computer implemented method of claim 1 wherein the positive and negative offsets are equal and opposite.

3. The computer implemented method of claim 1 wherein the positive and negative offsets for each PCA factor fall in a range from about two to about four standard deviations of a distribution of the PCA factor.

4. The computer implemented method of claim 1 wherein calculating the factor-specific loss risk amount for each PCA factor comprises determining gain and loss amounts for each PCA factor based on the pair of scenario curves.

5. The computer implemented method of claim 4 wherein calculating the factor-specific loss risk amount for each PCA factor further comprises:
   disregarding the gain amount; and
   taking the absolute value of the loss amount.

6. The computer implemented method of claim 1 further comprising generating the PCA factors based on decayed historical return data.

7. The computer implemented method of claim 1 wherein the number of PCA factors do not include PCA factors beyond level, slope, and curvature.

8. The computer implemented method of claim 1 wherein determining the margin requirement comprises:
   calculating a reserve charge for a tenor in the financial product portfolio; and
   adding the reserve charge to the sum of the factor-specific loss risk amounts.

9. The computer implemented method of claim 8 wherein the reserve charge is calculated when a reserve condition is satisfied.

10. The computer implemented method of claim 8 wherein the reserve charge comprises a time-dependent component and a portfolio-dependent component.

11. The computer implemented method of claim 8 wherein calculating the reserve charge comprises scaling a charge parameter by a price sensitivity of the tenor and a scale factor.

12. A system for determining a margin requirement for financial product portfolio, wherein market conditions for the financial product portfolio are characterized by a zero curve, the system comprising a processor and a memory coupled with the processor, the system further comprising:
   first logic stored in the memory and executable by the processor to generate a number of principal component analysis (PCA) factors for the zero curve, the number of PCA factors being factor-deficient;
   second logic stored in the memory and executable by the processor to produce a plurality of scenario curves, each scenario curve being produced from the number of PCA factors, the plurality of scenario curves comprising a pair of scenario curves for each PCA factor of the number of PCA factors by varying the PCA factor by a positive offset and a negative offset independently of the other PCA factors of the number of PCA factors such that the other PCA factors are not offset;
   third logic stored in the memory and executable by the processor to calculate a respective projected value of the financial product portfolio for each scenario curve of the plurality of scenario curves;
   fourth logic stored in the memory and executable by the processor to calculate, for each PCA factor, a factor-specific loss risk amount based on the projected values calculated for the pair of scenario curves produced for the PCA factor; and
   fifth logic stored in the memory and executable by the processor to determine the margin requirement based on a sum of the factor-specific loss risk amounts for the number of PCA factors.

13. The system of claim 12 wherein the positive and negative offsets are equal and opposite.

14. The system of claim 12 wherein the positive and negative offsets for each PCA factor fall in a range from about two to about four standard deviations of a distribution of the PCA factor.

15. The system of claim 12 wherein calculating the factor-specific loss risk amount for each PCA factor comprises:
   determining gain and loss amounts for each PCA factor based on the pair of scenario curves;
   disregarding the gain amount; and
   taking the absolute value of the loss amount.

16. The system of claim 12 wherein the number of PCA factors do not include PCA factors beyond level, slope, and curvature.

17. The system of claim 12 further comprising sixth logic stored in the memory and executable by the processor to calculate a reserve charge for a tenor in the financial product portfolio, and add the reserve charge to the sum of the factor-specific loss risk amounts.

18. The system of claim 17 wherein the reserve charge is calculated when a reserve condition is satisfied.

19. The system of claim 17 wherein the reserve charge comprises a time-dependent component and a portfolio-dependent component.

20. The system of claim 17 wherein the sixth logic is further executable by the processor to calculate the reserve charge by scaling a charge parameter by a price sensitivity of the tenor and a scale factor.

* * * * *